June 13, 1933.  C. V. RICE  1,913,771
DRILL BIT GRINDING MACHINE
Filed July 11, 1928
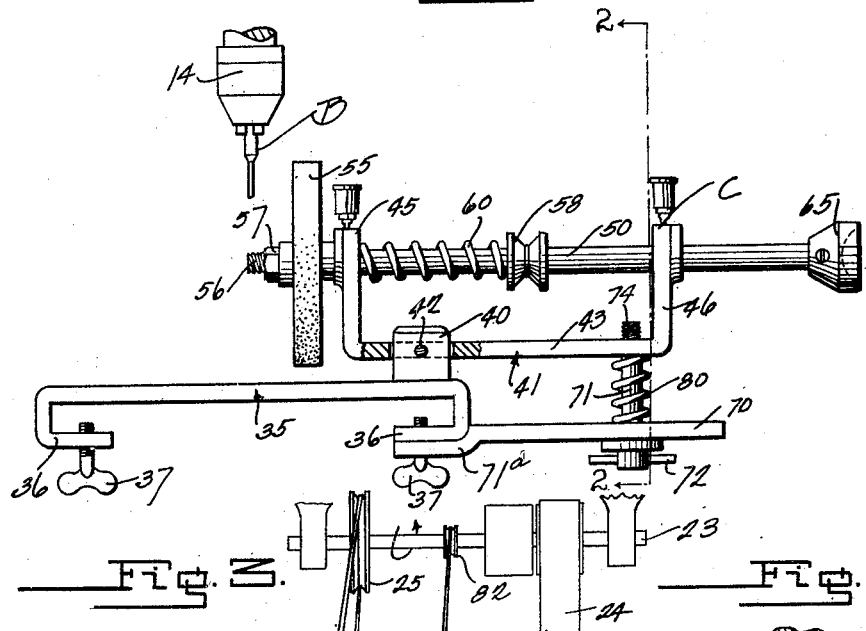
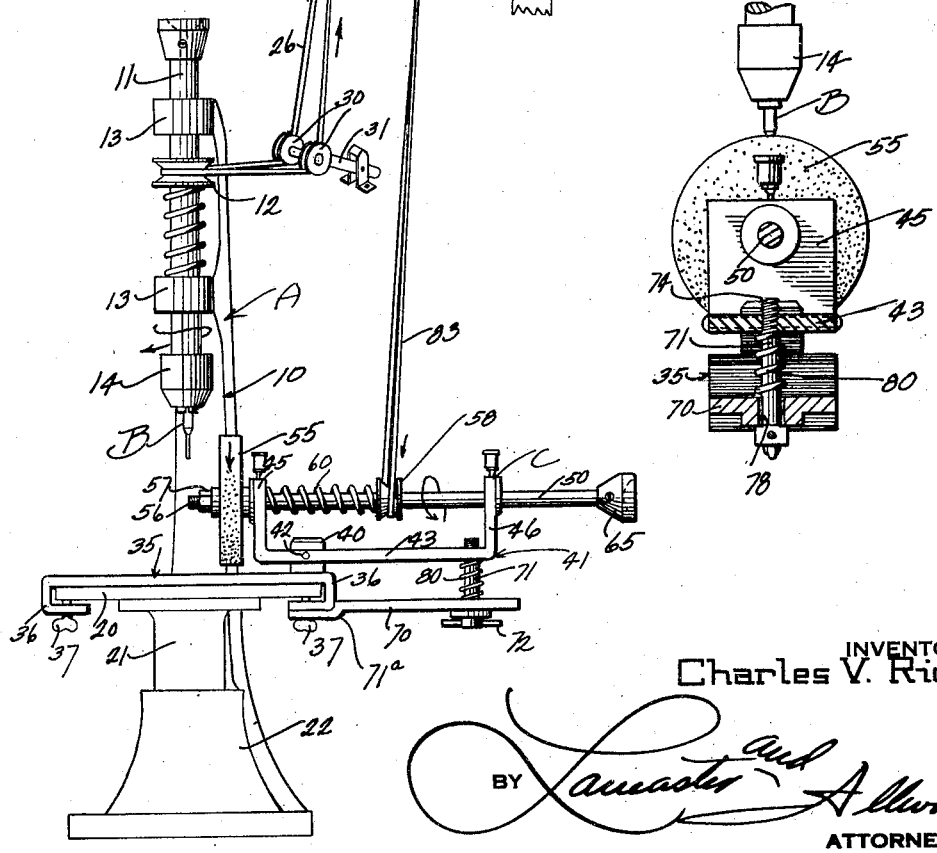
INVENTOR.
Charles V. Rice
BY Lancaster and Allwine
ATTORNEYS.

Patented June 13, 1933

1,913,771

UNITED STATES PATENT OFFICE

CHARLES V. RICE, OF CRESAPTOWN, MARYLAND

DRILL BIT GRINDING MACHINE

Application filed July 11, 1928. Serial No. 291,760.

This invention relates to improvements in apparatus for grinding the points on fine drills.

In the manufacture of small drills used in the watch industry, it is necessary to have drills with minute drilling shanks. It is necessary to take the drills after they have been turned on the lathe, and manually grind the points into shape by rotating the drill and holding the point to be ground between abrasive stones, until the drill shank is of the desired size. This is tedious, expensive, and the production is not great. It is therefore a primary object of this invention to provide an attachment for rotary drilling machines or the like, in which an abrasive wheel is driven in a cooperative relation against the drill until the latter has a shank or point thereon of the desired gauge.

It is a further object of this invention to provide an improved attachment for drilling machines, by means of which an operator may with facility and with accuracy move a rotating carborundum wheel or other grinding element into operative grinding relation to a rotating drill in an efficient manner for the accurate grinding of drills, and with an increased production of the same over present known methods of providing fine steel drills.

Still another object is to provide an improved attachment for drill presses employed in the watch making industry whereby a partly shaped drill is inserted in a drill press chuck, having a vertical axis of rotation, and a rotating abrasive surface moved against the drill until the latter is provided with a finished shape and is ready for use without removing from the drill press, thus rotating upon the same axis as when being shaped. This is particularly important, since the completed drill shaped in a lathe and then inserted in the chuck of a drill press, nearly always has a different axis of rotation resulting in a point revolving about the drill body axis which, while the path may be minute, would not be satisfactory in fine drilling operations incidental to watch making and the like.

Other objects and advantages of this invention will be apparent during the course of the following detailed description.

In the accompanying drawing, forming a part of this specification, and wherein similar reference characters designate corresponding parts throughout the several views, Figure 1 is a front elevation of the improved attachment showing its operating relation with respect to a drill supported by a drill chuck.

Figure 2 is an enlarged sectional view taken substantially on the line 2—2 of Figure 1.

Figure 3 is a front elevation showing the improved grinding attachment applied to a standard drilling machine.

In the drawing, wherein for the purpose of illustration is shown only a preferred embodiment of the invention, the letter A may generally designate the drilling machine or drill press, adapted to support a steel drill B, ordinarily received from the lathe; an improved attachment C being applied to the drilling machine for cooperative drive with the drilling machine in order to grind the pointed shank of the drill B to the desired gauge.

The drilling machine A is of preferably a conventional bench-drilling type, including a frame 10, rotatably supporting a spindle 11, which has a pulley 12 thereon; the spindle 11 being supported in bearings 13 forming a part of the frame 10. The spindle 11 has a chuck 14 of approved type at the lower end thereof, adapted to detachably receive the hard steel drills B of various sizes. The machine A furthermore includes a table 20, carried on a movable standard 21 supported by the base 22 of the frame 10.

A countershaft 23 is rotatably driven by means 24, and it has a pulley 25 thereon over which an endless belt 26 is trained; the endless belt 26 being trained over the spindle pulley 12 and held in position by means of suitable guide pulleys 30 carried by a pivoted jockey arm 31, in a manner which is well known to those skilled in the art. The drill supporting spindle 11 is driven in the direction shown by the arrow in Figure 3 of the drawing.

Referring to the improved attachment C, the same includes a supporting frame 35 having inturned socket flanges 36 at each of the sides thereof, adapted to receive the side margins of the drilling machine table 20 therein; the flanges forming the sockets for receiving the table, carry clamping screws 37 which are adapted to be clamped against the bottom of the table 20 to hold the frame 35 in place upon the table 20, as shown in Figure 3.

At one side the frame 35 is provided with an upstanding post 40, in which a substantially U-shaped spindle supporting frame 41 is pivoted by a pin 42. The U-shaped member 41 includes the elongated plate portion 43, having the upstanding bearing flanges 45 and 46 at opposite ends thereof; the plate 43 adjacent the flange 45 being provided with an opening thru which the post 40 extends, in order to pivot the spindle support 41, as shown in Figure 1 of the drawing, laterally of the drilling machine spindle when the attachment is placed on the drilling machine.

A spindle or shaft 50 forms part of the attachment and is rotatably supported in the bearing flanges 45 and 46; said bearing flanges being suitably enlarged and provided with bearing surfaces for receiving the spindle 50. The spindle 50 at one end extends beyond the flange 45, having a reduced shank on which a carborundum wheel 55 may be detachably mounted in a keyed relation with the spindle 50; the free end of the shaft or spindle 50 being screw threaded at 56 and having a clamping nut 57 to hold the carborundum wheel 55 in place.

Between the flanges 45 and 46 for the spindle or shaft 50 is disposed a pulley 58 which is keyed on the spindle. A spring 60 under compression is engaged at its ends with the bearing flange 45 and the pulley 58 and normally has a tendency to move the spindle 50 longitudinally in a right hand direction so that the carborundum wheel 55, when the attachment C is on the drilling machine A is remote from the drill adapted to be supported by the chuck 14. The spindle 50 extends beyond the bearing flange 46 and is provided with a finger engaging handle 65 thereon, for an obvious purpose of pushing the shaft 50 longitudinally to move the carborundum wheel 55 against the steel drill B supported by the chuck 48.

In order to give the proper tilt to the spindle support 41, an arm 70 is welded or otherwise rigidly secured at 71ª to the right hand socket flange 36, which at its outer end rotatably supports an adjusting screw or bolt 71, having a handle 72 below the arm 70, and having at its upper end a screw threaded shank 74 adjustably screw threaded in an opening in the plate portion 43 of the spindle frame 41. The shank has a loose fit in an opening 78 provided in the arm 70, and a spring 80 under compression between the arm 70 and the frame 41 to hold the latter to its proper position. It is readily understandable that by adjustment of the screw 71, the frame 41 may be tilted to properly position the carborundun wheel 55 for grinding.

A pulley 82, much smaller than the pulley 25, is keyed on the countershaft 23, and a belt 83 is trained over it and about the pulley 58 for driving the carborundum wheel 55 in a direction opposite from the rotational direction in which the drilling machine rotates the drill B which is to be ground.

The operation of the improved drill grinding attachment will be apparent from the foregoing. The drill B is clamped in the chuck 14, and the drill rotated in the direction shown in Figure 3. The spring 60 holds the carborundum wheel 55 normally out of engagement with the drill B. The operator slowly pushes the carborundum wheel spindle 50 to the left until the carborundum wheel 55 engages the shank of the drill B which is to be ground to the desired gauge, and with the carborundum wheel 55 rotating counter to the direction of rotation of the drill B, the grinding is accomplished under conditions which may be accurately controlled. If a taper on the end of the drill is desired, the degree of inclination of the carborundum wheel 55 is gauged by the screw 71, in a manner which is apparent from the drawing. It is apparent that the drill will be rotated faster than the carborundum wheel is rotated, because of the difference in the size of pulleys 25 and 82, and which facilitates the drill grinding operation.

Various changes in the shape, size, and arrangement of parts may be made to the form of invention herein shown and described, without departing from the spirit of the invention or the scope of the claims.

I claim:

1. The method of grinding drill bits to size which consists in rotating a drill bit about a vertical axis on the drilling machine on which the bit will later be used for drilling, and moving a rotary grinding element havrotation in the opposite direction of rotation as the drill bit into selected positions with respect to said bit so that the end grinding surface of said grinding element will approach the drill bit and engage it at selected angles to the axis of the drill bit.

2. In apparatus of the class described a supporting frame, a drill bit supporting shaft rotatably carried by the frame for rotation on a vertical axis, a grinding element, a shaft rotatably supporting the grinding element on a substantially horizontal axis for rotation in substantial right angled relation with respect to the axis of rotation of the drill bit, means for moving the grinding element longitudinally against the drill bit for grinding the same, and means normally resiliently urging the grinding element away from the drill bit supporting shaft.

3. In a machine of the class described a frame, a pair of spindles rotatably supported by the frame on axes transverse to each other and movable along said axes in converging relation, means on one spindle to support a drill bit on a vertical axis, an abrasive wheel supported on the other spindle and selectively presenting its peripheral face and both of its flat faces into engagement with the drill bit carried by the first mentioned spindle, and means to proportionately rotate said spindle in opposite directions.

4. In a machine of the class described a frame, a pair of springles rotatably supported by the frame on axes transverse to each other and movable along said axes in converging relation, means on one spindle to support a drill bit on a vertical axis, an abrasive wheel supported on the other spindle and selectively presenting both of its end faces into engagement with the drill bit carried by the first mentioned spindle, and means for rotating the spindles in opposite directions at different speeds of rotation.

5. The combination with a drilling machine including a base, a frame, a table, a spindle rotatable on the frame above the table, and means on the spindle for detachably supporting a drill bit to be used for drilling with said machine, a second spindle, a frame for rotatably supporting the second spindle, means to clamp the frame of the second spindle on the table of the machine, an abrasive wheel on the second spindle, said second spindle being movable longitudinally on its axis upon said last mentioned frame to move the wheel into grinding abutment with the drill bit.

CHARLES V. RICE.